(12) United States Patent
Huang et al.

(10) Patent No.: US 7,742,429 B1
(45) Date of Patent: Jun. 22, 2010

(54) METHOD AND SYSTEM OF PROMPTLY PROCESSING REAL-TIME MEDIA STREAM DATA PACKET

(75) Inventors: Hu Huang, Shenzhen (CN); Yanwei He, Shenzhen (CN); Rongjun Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1000 days.

(21) Appl. No.: 10/585,698

(22) PCT Filed: Jun. 4, 2004

(86) PCT No.: PCT/CN2004/000605

§ 371 (c)(1), (2), (4) Date: Jul. 10, 2006

(87) PCT Pub. No.: WO2005/071916

PCT Pub. Date: Apr. 8, 2005

(51) Int. Cl.
H04L 12/28 (2006.01)

(52) U.S. Cl. ........................ 370/254; 370/469

(58) Field of Classification Search ................. 370/278, 370/282, 290, 291, 395.21, 395.31, 395.52, 370/395.54, 467, 469, 474, 488, 497, 910, 370/254; 709/227, 231, 238
See application file for complete search history.

(56) References Cited

U.S. PATENT DOCUMENTS

| | | | |
|---|---|---|---|
| 6,757,256 B1 * | 6/2004 | Anandakumar et al. ..... | 370/252 |
| 6,934,756 B2 * | 8/2005 | Maes ........................... | 709/227 |
| 2003/0095567 A1 * | 5/2003 | Lo et al. ...................... | 370/466 |
| 2003/0156544 A1 * | 8/2003 | Ido .............................. | 370/241 |
| 2004/0044720 A1 * | 3/2004 | Jang et al. ................... | 709/200 |
| 2004/0057436 A1 * | 3/2004 | Couturier et al. ........ | 370/395.21 |

FOREIGN PATENT DOCUMENTS

| | | |
|---|---|---|
| KR | 2002055264 A | 7/2002 |
| WO | WO 03/039170 A1 | 5/2003 |

\* cited by examiner

*Primary Examiner*—Kevin C Harper
*Assistant Examiner*—Leon Andrews
(74) *Attorney, Agent, or Firm*—Thomas, Kayden, Horstemeyer & Risley, LLP (57) ABSTRACT

A method and system for fast transporting real-time media stream data package is based on the Real-time Transport Protocol/Real-time Transport Control Protocol of User Datagram Protocol for network nodes such as media gateway, Integrated Access Device (IAD) and multimedia terminal. The improvement of the system lies in the adding of an IP data package fast filter module, a UDP fast sending module and a policy ARP table process module based on local UDP port. The method involves: fast receiving the real-time media stream data package transmitted on the basis of RTP/RTCP protocol; fast sending the real-time media stream data package transmitted on the basis of RTP/RTCP protocol; and a policy ARP table based on UDP port and its refurbishing system.

16 Claims, 4 Drawing Sheets

METHOD AND SYSTEM OF PROMPTLY PROCESSING REAL-TIME MEDIA STREAM DATA PACKET

CROSS-REFERENCE TO RELATED APPLICATIONS

This application is a national stage application of International Application No. PCT/CN2004/000605, filed Jun. 4, 2004, which claims priority to Chinese Patent Application No. 200410015145.5, filed Jan. 15, 2004, both applications of which are hereby incorporated by reference in its entirety into the present application.

TECHNICAL FIELD

The present invention relates to a data communication technique and equipment of IP (Internet protocol) network, particularly relates to a rapid processing method and system for transporting real-time media stream data package based on RTP/RTCP protocol of UDP (User Datagram Protocol), employed in equipments such as media gateway, IAD (Integrated Access Device), IP multimedia terminal etc. to fast receive and transmit real-time media stream data package transmitted on the basis of RTP/RTCP.

TECHNICAL BACKGROUND

With the prevalence of Internet and employment of multimedia technique on Internet, the technique for transmitting real-time media stream such as real-time transmission video, audio etc. is now urgently needed. Currently, the real-time media stream data such as video and audio, is commonly transmitted by employing RTP/RTCP protocols (Real-time Transport Protocol/Real-time Transport Control Protocol).

The real-time transport protocol RTP provides time information and realizes stream synchronization; RTP itself can neither provide reliable transport system to transmit data package in order nor traffic control or congestion control service, it provides these services through real-time transport control protocol RTCP; the RTCP and RTP together provide traffic control and congestion control services; during RTP session, each participant transmits RTCP package periodically; the RTCP package comprises statistic information like the amount of data package already transmitted and the amount of lost data package, by which the transport rate can be changed dynamically, even the valid load type can also be changed. By coordinately using RTP and RTCP, effect feedback and least overhead can be achieved as to optimize transport efficiency, therefore, they are especially suitable for transporting real-time data on network. Commonly, RTP/RTCP algorithm is not realized as an independent network layer, rather it is realized as a part of application code. The RTP/RTCP commonly uses UDP (User Datagram Protocol) to transmit data; when the application starts a RTP/RTCP session, it will use two local ports: one is assigned to RTP, the other to RTCP.

Figure 1:
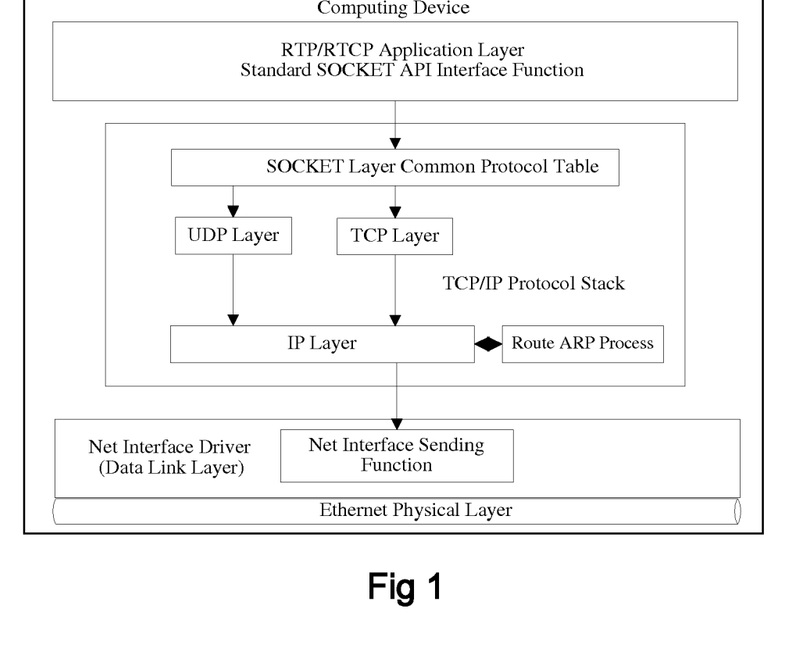
FIG. 1 is a block for conventional real-time media stream data package sending in prior art.

FIG. 1 is the conventional sending flowchart of RTP/RTCP data package within a computing device. When said RTP/RTCP application program transports the real-time media stream data package, it will call "SendTo( )" function of SOCKET API and within the SOCKET layer through functions such as "sendit( )" and "sosend( )" perform the following operations: "sendit( )" function preparing data structure "msghdr" required for "sosend( )" system calling, initializing "uio" structure, constructing "MBUF," collecting the data in output buffer designated by process into the core buffer, copying the control and address information in process space into core, and finally transporting interface, destination address, "uio" structure, control information, flag and all the like to the function "sosend( )"; the function "sosend( )" is for checking error condition and waiting for idle space in transport buffer, when checking error condition, in order to prevent the buffer from changing, first hanging up protocol process, copying the data from process into the core, and transporting the data to interface-related UDP protocol layer by calling "udp_output( )". UDP layer is used for analysising the control information, data and their validity, connecting an unconnected interface temporarily, filling the field of "udpiphdr" structure, preparing fake head for check and calculation, calculating check sum, length of filling UDP, TTL (Time to Live) and TOS (Type of Service) etc., and finally calling "ip_output( )" to send the data package to IP layer. Within the IP layer, perform the following operations: initializing IP head, determining a route to destination and obtaining MAC (Media Access Control) address of next hop to ensure that the IP head has a effective address, copying data and calculating check sum, submitting the package to route-related interface "if_output( )" function to finish filling Ethernet head data, and finally calling the sending function of net interface driven layer. Said sending function of net interface driven layer copies the Ethernet package data in "MBUF" and drives the network interface hardware to transmit the data to physical layer.

Figure 2:
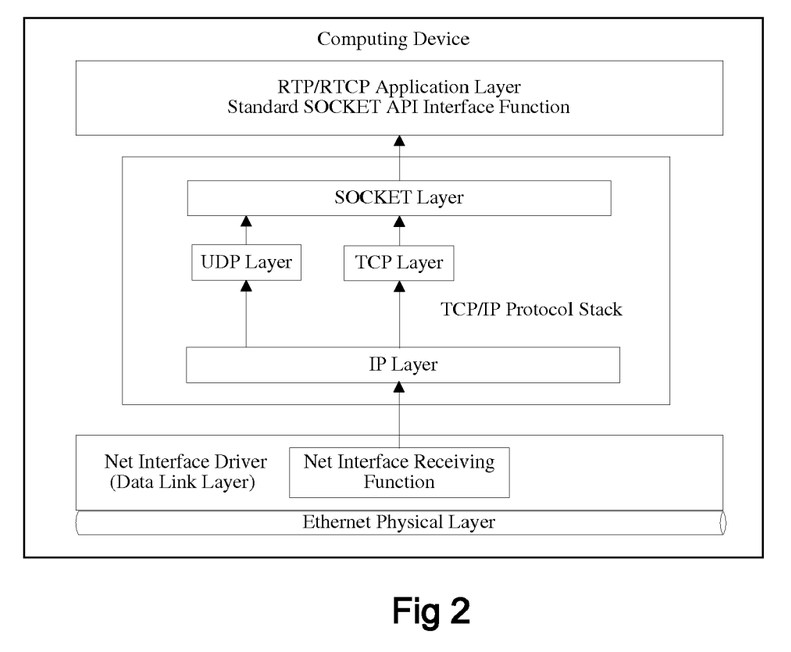
FIG. 2 is a block for conventional real-time media stream data package receiving in prior art.

FIG. 2 is the conventional receiving flowchart of RTP/RTCP data package in a computing device. Upon net interface reception function (i.e. Net interface driven Ethernet frame reception function) receiving one UDP based RTP/RTCP real-time media stream data package, a recalling function "ether_input( )" registered through TCP/IP (Transmission Control Protocol/Internet Protocol) protocol stack uploads the data to the TCP/IP protocol stack; after the process of IP protocol stack layer, the data is further distributed to the UDP layer for processing, then a "udp_input( )" function in UDP layer finds corresponding reception SOCKET in order according to the destination port number in the UDP data package, and deposits the data into corresponding reception buffer, as such the process of layer-dividing package-breaking is performed. RTP/RTCP protocol layer application will call "recvfrom( )" function to read data from SOCKET reception buffer and put the data into the application task buffer every a certain interval of time.

From experiment and analysis, it is found that employing the method for transmitting RTP/RTCP data package in media gateway, IAD, IP multimedia terminal involves some unnecessary processes, resulting in low process efficiency, representing in the following three detailed aspects:

1. The real-time media stream data is carried on UDP through the RTP/RTCP data package, according to the characteristic of RTP/RTCP data package, the application of RTP/RTCP protocol layer has already determined the original IP, original PORT, destination IP, destination PORT etc., while the standard TCP/IP protocol stack and SOCKET layer also have many analysis and judgment processes for protocol and address, whose results are obviously known, redundant and unnecessary for the transmission of RTP/RTCP data package.

2. The standard TCP/IP protocol stack fills the related data package field in different layers, and processes different protocol layer data layer by layer, so the number of layers is large, resulting in many dynamic memory application operations, requiring for a lot of operations of data structure conversion, data copy and data judgment which are time-consuming and will occupy a large part of CPU (Central Processing Unit) resource. According to the characteristic of the real-time media stream RTP/RTCP data package in a session, the real-time media stream data package transmitting from application to network driver can be realized by a new process function, skipping over the SOCKET layer and standard protocol stack.

3. When sending data by the standard TCP/IP protocol stack, the operations of route and ARP (Address Resolution Protocol) lookup for each data package have to be performed, which are very time-consuming. According to the characteristic of the real-time media stream RTP/RTCP data package in a session, software can employ port based ARP policy to greatly decrease the time-consuming operations of route and ARP lookup.

There are also some unnecessary processes in using the method for receiving RTP/RTCP data package in media gateway, IAD, IP multimedia terminal etc., resulting in low process efficiency, representing in the following two detailed aspects:

1. The process of layer-dividing package-breaking involves many redundant and time-consuming operations, such as judging protocol type, address information and data validity for multiple times, conversing data structure for multiple times, and copying data for multiple times, which are unnecessary for the UDP data reception in the scope of known port.

2. The application of RTP/RTCP protocol layer receiving data by employing SOCKET programming timing inquiry form greatly increases time-delay, and wastes the CPU resource.

As described above, in the conventional RTP/RTCP data package processing, the RTP/RTCP application layer accomplishes interfacing through SOCKET API and TCP/IP protocol stack, and the TCP/IP protocol stack and network driver layer accomplish the reception and sending of data. In the direction of sending, the RTP/RTCP application layer program calls the SOCKET API sending function to send the data, with a low process efficiency; in the direction of receiving, the RTP/RTCP protocol application calls the SOCKET API receiving function to receive the data package in the form of time inquiry, and performs layer-dividing package-breaking process, also with a low process efficiency.

SUMMARY OF THE INVENTION

The present invention aims to provide a method and system for fast processing real-time media stream data package, so as to improve process efficiency of RTP/RTCP data package and process ability of equipment, and reduce the network time-delay of the media stream data package, thereby improving QoS.

In order to realize the above objects, the present invention provides a method for fast processing real-time media stream data package, employed in a network system comprising media gateway, IAD and IP multimedia terminal, with characterized in replacing the data receiving process function set and SOCKET receiving process of TCP/IP protocol stack by using IP data package fast filter module in the receiving direction, eliminating the data structure conversion in the process of layer-dividing package-breaking of TCP/IP protocol stack, replacing the data sending process function set and SOCKET sending process of TCP/IP protocol stack by using UDP rapid sending module in the sending direction, and reducing the calling of function for multi-layer distribution process when sending real-time media stream data package. This method eliminates the multiple conversions of data structure and reduces application of dynamic memory as well as data copy.

In order to better realize the above objects, the present invention further provides a system for fast processing real-time media stream data package, comprising an IP data package fast filter module, an UDP fast sending module, a policy ARP table process module based on local UDP port and a RTP/RTCP fast receiving process function registered on the basis of UDP port; in which said RTP/RTCP fast receiving process function is located in a RTP/RTCP application layer;

said policy ARP table process module based on local UDP port connects with said IP data package fast filter module and said UDP fast sending module for communication, and said policy ARP table process module based on local UDP port constructs an ARP table with a port mapping value being suffix, according to the resource distribution of RTP/RTCP protocol port and the characteristics of RTP/RTCP protocol port;

said IP data package fast filter module installs fast receiving hook function in data link layer receiving function; said hook function is used for analyzing content of Ethernet data package; RTP/RTCP application layer registers RTP/RTCP fast receiving process function corresponding to UDP port in said hook function;

said UDP fast sending module is used to directly call the sending function provided by said UDP fast sending module when the RTP/RTCP application layer sending the real-time media stream data package, after the process of UDP fast sending module, finally calling the corresponding net interface sending function to send the data;

said IP data package fast filter module is used to receive the real-time media stream data package from a net interface receiving function, transmit it to the RTP/RTCP fast receiving process function, thus directly transmitting it to the task buffer of said RTP/RTCP application layer.

The above system further comprises a TCP/IP protocol stack module, through which said UDP fast sending module, when it is not able to accomplish sending the data package, uses SOCKET API to send the data package.

In the above system, the information in said ARP table mainly includes: a destination IP address of data package, a MAC address of next hop and refurbishing time of the table of last time.

In the above system, said hook function analyzing the content of Ethernet data package includes: analyzing whether the data package is IP data package, if yes, further analyzing whether it is UDP data package, if yes, further analyzing whether it is registered data package in the scope of UDP port, if still yes, calling the corresponding RTP/RTCP fast reception process function registered on the basis of UDP port to directly transport the real-time media stream data package to the task buffer of RTP/RTCP application layer.

In the above system, said hook function analyzing the content of Ethernet data package further includes: analyzing whether the data package is IP data package, if not, the hook function entity further analyzing whether it is gratuitous ARP package, if yes, initiating ARP table refurbishing system based on local UDP port policy to invalidate the policy ARP table.

In order to better realize the above objections, the present invention provides said method for fast processing real-time media stream data package, comprising the following steps of:

a) said policy ARP table process module based on local UDP port constructing an ARP table with a port mapping value being suffix according to the distribution of equipment RTP/RTCP protocol port resource and the characteristics of RTP/RTCP protocol port;

b) the upper layer application calling the UDP fast sending module to send RTP/RTCP data package, and obtaining the MAC address of next hop according to the destination IP address of the RTP/RTCP data package by using the relevant interface function of conventional TCP/IP protocol stack;

c) if obtaining the MAC address of next hop successfully, then refurbishing the MAC address of next hop in the ARP table, and sending the RTP/RTCP data package directly, thereafter, if the destination IP address transmitted on the UDP port remains unchanged and the port ARP table has not reached ageing time, then directly using the MAC address of the next hop in the ARP table to fill the destination MAC address of the Ethernet data package, and fast sending the RTP/RTCP data package; and d) if the MAC address of the next hop can not be obtained, sending the RTP/RTCP data package through TCP/IP UDP SOCKET API, so that TCP/IP protocol stack can obtain the next hop MAC address and refurbish the protocol stack ARP table, and when sending the next data package of the port, can successfully obtain the MAC address of the next hop and refurbish the MAC address of the next hop in the policy ARP table based on local UDP port.

In the above method, said method for fast sending RTP/RTCP data package comprises the following steps of:

a1) initializing the whole Ethernet data frame structure and filling relevant fields according to the condition of said RTP/RTCP application layer;

a2) the RTP/RTCP application layer, when sending the real-time media stream data package, preparing parameters such as protocol layer data index, data length, original IP address, destination IP address, original UDP port number, destination UDP port number, and calling the RTP/RTCP sending function provided by the UDP fast sending module;

a3) the UDP fast sending module obtaining the MAC address of the next hop from the ARP table according to the original UDP port number and destination IP address; if failed, sending the RTP/RTCP data package through the TCP/IP protocol stack module;

a4) if obtaining successfully, using the initialized Ethernet data frame structure and filling corresponding fields, and calculating and filling checking fields of IP, UDP as necessary; and a5) calling the net interface sending function to send the data package.

In the above method, the method for fast receiving the RTP/RTCP data package comprises the following steps of:

b1) maintaining a protocol layer callback function register according to the distribution of local UDP port resource of the system, and registering a RTP/RTCP fast receiving process function to receive and process the UDP data package corresponding to the destination port number, said RTP/RTCP fast receiving process function accomplishing writing the RTP/RTCP data package into the buffer of the RTP/RTCP application layer;

b2) registering a Ethernet data package fast receiving process hook function in the net interface receiving function, the entity of the hook function being the IP data package fast filter module used for analyzing whether the Ethernet data package is the UDP/IP data package of the net interface and performing filter process;

b3) calling back the function register according to the destination port number of the UDP data package and RTP/RTCP application layer, calling the callback function RTP/RTCP fast receiving process function registered by RTP/RTCP application layer and corresponding to the UDP destination port number, and this callback function accomplishing the process of the UDP data package;

b4) if the IP data package fast filter module has been successfully processed by the callback function RTP/RTCP fast receiving process function registered by RTP/RTCP application layer, then returning a sign of being processed; and b5) the net interface receiving function judging whether to continue sending it to the TCP/IP protocol stack module for processing according to whether the sign returned by the Ethernet data package fast receiving process hook function is the sign of being processed or not.

The above method, wherein, if in the step b4 hasn't been processed, then analyzing whether it is gratuitous ARP package; when receiving the gratuitous ARP package on the net interface receiving function, invalidating the MAC address in the ARP table, so as to actively obtain the next hop MAC from the TCP/IP protocol stack and refurbish the ARP table during the later RTP/RTCP data package sending.

The above method, wherein, in step d, defining a refurbishing time interval, so as to refurbish the policy ARP table based on local UDP port.

The method and system for fast processing the real-time media stream data package of the present invention fully takes advantages of the characteristics of RTP/RTCP protocol data real-time media stream, changing the process flowchart of media stream data package fundamentally.

First, in the direction of receiving, the present invention uses IP data package fast filter module to replace the TCP/IP protocol stack data receiving process function set and SOCKET receiving process, and eliminates the data structure conversion during TCP/IP protocol stack layer-dividing package-breaking, greatly reducing various judgments on availability and validity of protocol types, address information and data content. RTP/RTCP application layer does not need the timing inquiry operation in SOCKET programming, the RTP/RTCP protocol real-time media stream data is written into the buffer of RTP/RTCP application layer directly through the callback function registered by the RTP/RTCP application layer.

Second, in the direction of sending, the present invention uses UDP fast sending module to replace the TCP/IP protocol stack data sending process function set and the SOCKET sending process, and reduces the function calling for multiple layer distribution when sending real-time media stream data package, therefore, eliminating multiple data structure conversions and reducing dynamic memory application as well as data copy.

It is more important that the present invention fundamentally changes the next hop address lookup system for sending data package in the conventional TCP/IP protocol stack by using policy ARP table process module of local UDP port.

Compared to the conventional TCP/IP protocol stack and SOCKET programming receiving and sending, the system and method of the present invention can fast process real-time media stream data package, improving the process ability of equipment, and reducing the network time delay of media stream data package, therefore, improving the QoS (Quality of Service).

In the following, the embodiments of technical scheme of the present invention will be further described in detail in combination with the appended drawings.

PREFERRED EMBODIMENTS OF THE INVENTION

Figure 3:
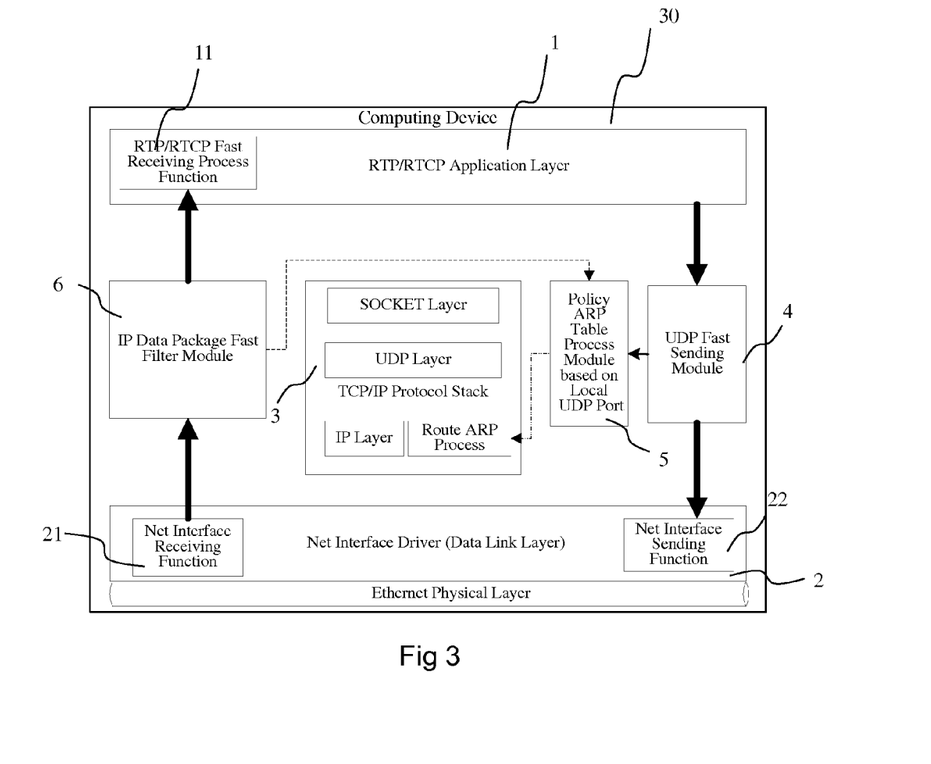
FIG. 3 is a block of fast processing real-time media stream data package module of the present invention.

Referring to FIG. 3, the improved embodiments of the present invention over the prior art (the scheme shown in FIG. 1 and FIG. 2) concerns three main creative parts of invention: IP data package fast filter module 6, UDP fast sending module 4 and policy ARP table process module 5 based on local UDP port. The system of the present invention further includes: conventional TCP/IP protocol stack module 3 and RTP/RTCP fast receiving process function 11 registered on the basis of UDP port, a net interface receiving function 21 and a net interface sending function 22 located in data link layer 2; the RTP/RTCP fast receiving process function 11 is located in the RTP/RTCP application layer 1. As can be appreciated by one of ordinary skill in the art, all modules may be implemented within one or more computing devices 30.

The system for fast processing real-time media stream data package of the present invention performs fast receiving and sending process by fully using the characteristics of RTP/RTCP real-time media stream data package. In the direction of sending, the RTP/RTCP real-time media stream is characterized in the already known data package original IP address, destination IP address, original UDP port and destination UDP port; in the direction of receiving, the RTP/RTCP real-time media stream is characterized in the already known data package destination IP address and scope of destination UDP port.

The policy ARP table process module 5 based on local UDP port is characterized in: constructing an ARP table with port mapping value being suffix (index) according to distribution of equipment RTP/RTCP protocol port resource and features of the RTP/RTCP protocol port; the information in the ARP table mainly including: data package destination IP address, for storing the destination IP address of previous UDP data package on the local UDP port; the next hop MAC address, for storing the MAC address corresponding to the data package destination IP address; and the table refurbish time of last time.

At the very beginning, the upper application calls fast sending interface to send the RTP/RTCP data package. At this time, the data package destination IP address required to be send is not equal to that in the policy ARP table based on local UDP port, it needs to use relevant interface function of conventional TCP/IP protocol stack to obtain the next hop MAC address according to the RTP/RTCP data package destination IP address.

If the next hop MAC address is obtained successfully, refurbishing said next hop MAC address in the ARP table, and sending the RTP/RTCP data package directly, thereafter, if the destination IP address sent on the UDP port does not change, and the port ARP table has not reached aging time, then using the next hop MAC address in the ARP table to fill the destination MAC address of Ethernet data package, so as to realize fast sending the RTP/RTCP data package.

If the obtaining of the next hop MAC address fails, sending the RTP/RTCP data package through TCP/IP UDP SOCKET API (Application Programming Interface), so that the RTP/RTCP protocol stack module 3 initiates the conventional flowchart of obtaining the next hop MAC address, and refurbishes the ARP table of TCP/IP protocol stack, when sending the next data package of the port, it needs to obtain the next hop MAC address and refurbish the next hop MAC address in the policy ARP table based on UDP port.

When net interface receiving function receives a gratuitous ARP package, it needs to invalidate the MAC address in the ARP table, thus being able to actively re-obtain the next hop MAC from TCP/IP protocol stack module 3 in the following sending RTP/RTCP data package, and refurbish ARP table. A refurbishing time interval can also be defined so as to refurbish the policy ARP table based on local UDP port according to timing.

The IP data package fast filter module 6 is characterized in: installing fast receiving hook function in the net interface receiving function 21 of the data link layer 2; the hook function entity analyzing the content of Ethernet data package; the RTP/RTCP application layer 1 registering RTP/RTCP fast receiving process function 11 corresponding to UDP port in the hook function entity.

Further, the process of the hook function entity analyzing the content of Ethernet data package includes: analyzing whether the Ethernet data package is IP data package, if yes, further analyzing whether it is UDP data package, if yes, further analyzing whether it is registered data package within UDP port scope, if yes, calling corresponding RTP/RTCP fast receiving process function 11 registered on the basis of UDP port, and directly transmitting the real-time media stream data package to the buffer in RTP/RTCP application layer 1.

If the Ethernet data package is not IP data package, then the hook function entity further analyzing whether it is a gratuitous ARP package, which differentiates from other ARP packages in that its data package destination IP address is identical with original IP address, if yes, initiating the policy ARP table refurbish system based on local UDP port, and invalidating the policy ARP table.

The UDP fast sending module 4 is characterized in: the RTP/RTCP application layer 1 directly calling the net interface sending function 22 provided by the UDP fast sending module 4 when sending real-time media stream data package, after the process of the UDP fast sending mode 4, at last, calling the corresponding net interface driver sending function to send out the data.

Further, the UDP fast sending module 4 making full use of the characteristics of RTP/RTCP sending real-time media stream to maintain the policy ARP table based on local UDP port and obtain the next hop MAC address, thereby, the receiving and sending of Ethernet data package avoiding the process of TCP/IP protocol stack module 3 of prior art to the most extent, greatly reducing the operations of route and ARP lookup which are time-consuming by employing policy ARP table based on local port; and by using the applied and initialized Ethernet data package structure in the sending process, many fields in the data package needing not to be re-filled, thus improving the transmitting efficiency for RTP/RTCP transmitting real-time media stream in both the directions of sending and receiving, and decreasing the usage of CPU.

Furthermore, the UDP fast sending module 4 is further characterized in: in the situation that the UDP fast sending module 4 is able to complete the data package sending, the system of the present invention still using SOCKET API to send data package through the TCP/IP protocol stack module 3; as the conventional TCP/IP protocol stack supports SOCKET interface and some standard IO control interfaces, the present invention being able to obtain the next hop IP address by calling interface provided by conventional protocol stack according to the data package destination IP; by calling the interface provided by conventional protocol stack, the present invention being able to obtain the MAC address corresponding to the IP address according to the next hop IP address.

The IP data package fast filter module 6 is further characterized in: the RTP/RTCP fast receiving process function 11 registered on the basis of UDP port being responsible for transmitting the real-time media stream data package to the buffer in RTP/RTCP application layer 1.

Next, a preferred embodiment of the present invention will be described in detail:

In the system and method of the present invention, in the direction of receiving RTP/RTCP data package, using the IP data package fast filter module 6 to replace the TCP/IP protocol stack module 3 of prior art, and directly writing the RTP/RTCP data package received from the net interface receiving function 21 into the data receiving buffer of the corresponding RTP/RTCP protocol application through the RTP/RTCP fast receiving process function 11 which is based on local UDP port scope and registered by RTP/RTCP protocol application. In the direction of sending RTP/RTCP data package, using the UDP fast sending process module 4 to replace the TCP/IP protocol stack module 3 of prior art, directly writing the data of RTP/RTCP application layer 1 into the sending buffer of net interface sending function 22. According to the distribution of equipment RTP/RTCP protocol port resource, providing a policy ARP table based on local UDP port and its lookup and refurbishing system to replace the route of TCP/IP protocol stack and the next hop MAC address lookup system.

The policy ARP based on local UDP port and its lookup and refurbishing system includes:

A. constructing an ARP table with port mapping value being suffix (index), that is a structure array "PORT_IP_MAC_TABLE [PORT_MAP_VALUE]," according to the distribution of equipment RTP/RTCP protocol port resource and the characteristics of RTP/RTCP protocol port. For example, if the RTP/RTCP port resource scope is 10000-20000, then the mapping relation between the structure array suffix and UDP port can be that UDP port number X corresponds to suffix

Figure 4:
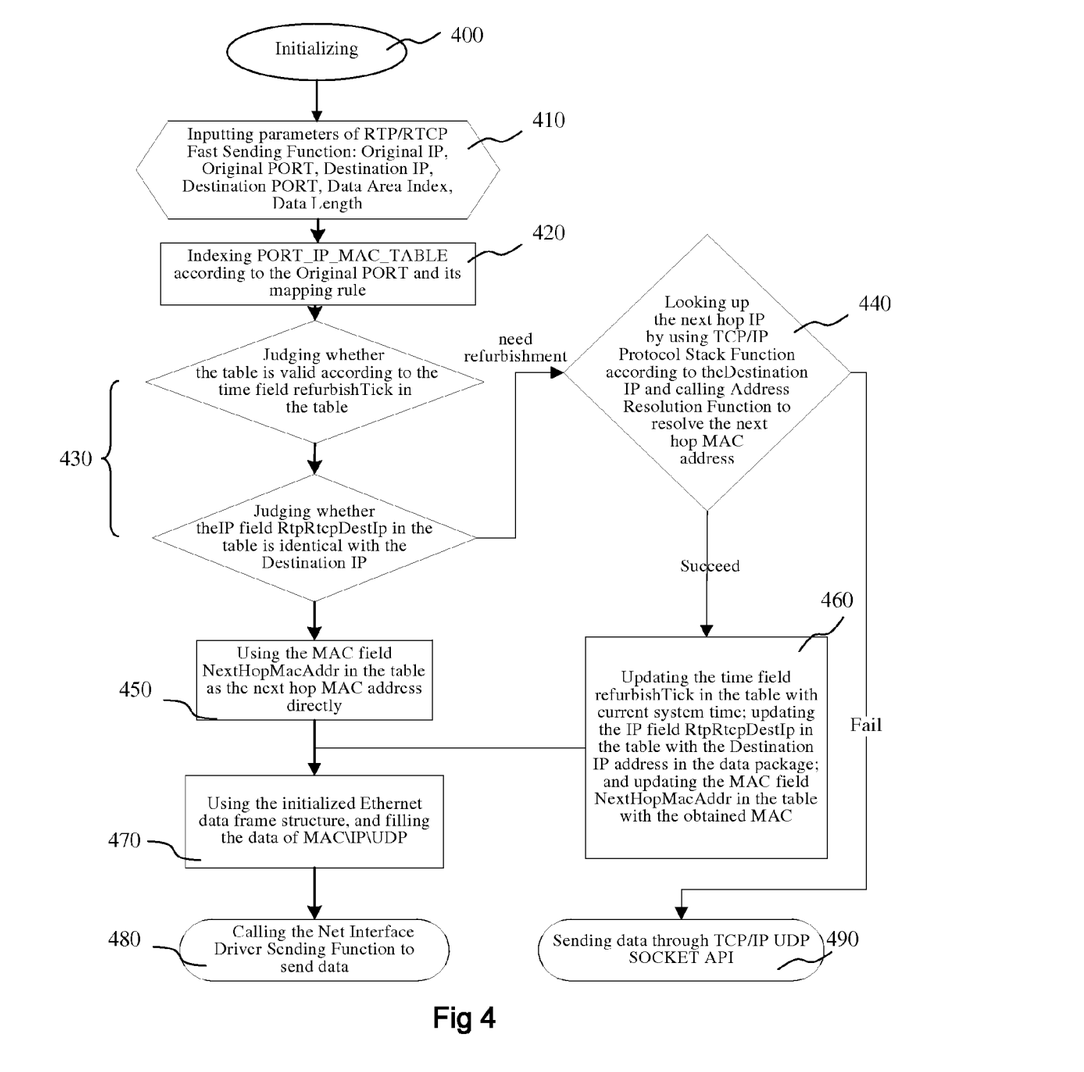
FIG. 4 is a flowchart of real-time media stream fast sending process of the present invention.

PORT_MAP_VALUE=(X−10000)/2;

B. the ARP table structure content including "RtpRtcpDestIp" of 4 bytes, "NextHopMacAddr" of 6 bytes, "refurbishTick" of 4 bytes, wherein the "RtpRtcpDestIp" stores the destination IP address of previous UDP data package on local UDP port, "NextHopMacAddr" stores the next hop MAC address corresponding to "RtpRtcpDestIp," and refurbishTick stores the previous refurbishing time of the table;

C. as shown in FIG. 3, when the IP data package fast filter process module 6 receives a gratuitous ARP package, invalidating the MAC address in the table by clearing the "refurbishTick" of each table in the "PORT_IP_MAC_TABLE" table, thus being able to re-obtain the next hop MAC actively from the TCP/IP protocol stack module 3 and refurbish the data in the table when sending RTP/RTCP data package;

D. defining a refurbishing time interval, when RTP/RTCP application layer 1 sending the real-time media stream data, as shown in FIG. 4, the RTP/RTCP application layer 1 first judging whether the content of the table needs to be refurbished according to the "refurbishTick" of UDP original port corresponding data, system time value and the defined refurbishing time interval, if has not reached the refurbishing time, then going on to perform step E; if needing refurbishment, performing step F;

E. judging whether the destination IP address of the transmitted RTP/RTCP data package and the "RtpRtcpDestIp" in the table are identical, if yes, going on to perform step G, otherwise performing step F;

F. obtaining the next hop MAC address by using relevant route of the TCP/IP protocol stack and ARP function according to the destination IP address of the transmitted RTP/RTCP data package, if succeeding, refurbishing the "refurbishTick," "NextHopMacAddr," "RtpH248DestIp" of ARP table, and going on to perform step G, otherwise, sending the RTP/RTCP data package through TCP/IP UDP SOCKET API, so that TCP/IP protocol stack refurbishes ARP table; and G. directly using the next hop MAC address "NextHopMacAddr" in the ARP table to fill the destination MAC address of Ethernet data package, and fast sending the RTP/RTCP data package.

Next, the method for fast sending RTP/RTCP data package disclosed in the present invention will be further described in combination with FIG. 3 and FIG. 4, which includes the following steps of:

step 400, initializing the data frame structure of the whole local Ethernet of the computing device 30 according to the situation of the RTP/RTCP application layer 1, and filling relevant fields;

step 410, when the RTP/RTCP application layer 1 is about to send real-time media steam data package, it needing to prepare such parameters as protocol layer data index, data length, original IP address, destination IP address, original UDP port number, destination UDP port number etc., that is the process of RTP/RTCP fast sending function inputting parameter;

step 420, calling the RTP/RTCP sending function provided by the UDP fast sending module 4 to index "PORT_IP_MAC_TABLE" table according to the original PORT and its mapping rule;

step 430, the UDP fast sending module 4 obtaining the next hop MAC address from the "PORT_IP_MAC_TABLE" according to the original UDP port number and destination IP address, judging whether the table is valid according to the time field "refurbishTick" of the table; further judging whether the IP field "RtpRtcpDestIp" in the table is identical with the destination IP, if no, performing step 450; if yes, performing step 440 to refurbish;

step 440, using TCP/IP protocol stack function according to the destination IP to look up the next hop IP, and calling address resolution function to resolve the next hop MAC address; if succeeds, performing step 470; if fails, performing step 490, that is, sending RTP/RTCP data package through TCP/IP UDP SOCKET API, so that TCP/IP protocol stack refurbishes ARP table;

step 450, directly using the MAC fields "NextHopMacAddr" in the table as the next hop MAC address;

step 460, using the already initialized Ethernet data frame structure, and filling the data of MAC\IP\UDP, that is, using the already initialized Ethernet data frame structure, and filling corresponding fields, such as original IP, destination IP, original PORT, destination PORT, original MAC, destination MAC etc., and calculating and filling check fields of IP, UDP if necessary; and step 480, calling the net interface driver, that is the net interface sending function of data link layer, to send data.

Figure 5:
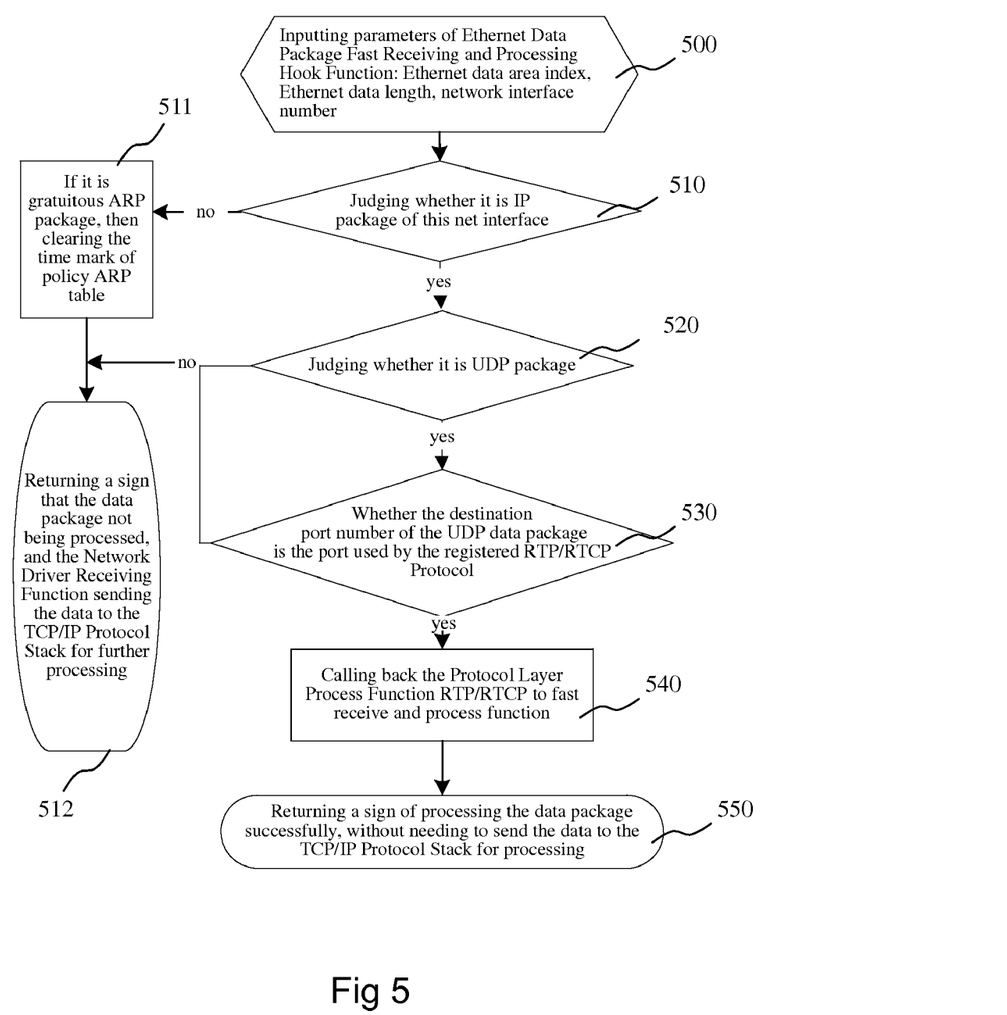
FIG. 5 is a flowchart of real-time media stream fast receiving process of the present invention.

Next, the method for fast receiving RTP/RTCP data package disclosed in the present invention will be further described in combination with FIG. 3 and FIG. 5, which includes the following steps of:

maintaining a protocol layer callback function register table according to the distribution of local UDP port resource of the present invention system, for example, UDP port number 10000-20000 corresponds to RTP/RTCP data package, and registering a RTP/RTCP fast receiving process function to receive UDP data package with process destination port number 10000-20000, in which, the RTP/RTCP fast receiving process function 11 is mainly for writing RTP/RTCP data package into the buffer of RTP/RTCP application layer 1; performing step 500, registering an Ethernet data package fast receiving process hook function in the net interface driver, that is the net interface receiving function of data link layer, the entity IP data package fast filter module of the hook function analyzing the Ethernet data package and performing filter process;

step 510, the IP data package fast filter module 6 analyzing whether the Ethernet data package is the IP package of this net interface, if not, performing step 511; if yes, performing step 520;

step 520, the IP data package fast filter module 6 analyzing whether the Ethernet data package is UDP data package of this net interface, if not, performing step 512; if yes, performing step 530;

step 530, further judging whether the destination port of the UDP data package is the port used by the registered RTP/RTCP protocol, if yes, performing step 540, calling back the protocol layer register function RTP/RTCP fast receiving process function, i.e. calling back function register table according to the destination port number of UDP data package and RTP/RTCP application layer, and calling the callback function RTC/RTCP fast receiving process function registered by the RTP/RTCP application layer corresponding to the UDP destination port number, and this callback function accomplishing the process of the UDP data package;

step 550, returning a sign of processing the data package successfully, without needing to send the data to the TCP/IP protocol stack module 3 for process, that is, if the IP data package fast filter module has successfully passed the process of the callback function RTP/RTCP fast receiving function 11 registered by the RTP/RTCP application layer, then returning a sign of having been processed;

step 511, analyzing whether the data is a gratuitous ARP package, if yes, invalidating the MAC address in the table by clearing the time mark of policy ARP table, that is, clearing the "refurbishTick" of each table in the "PORT_IP_MAC_TABLE" table; and step 512, returning a sign of the data package not being processed, and the network driver receiving function sending the data to the TCP/IP protocol stack module 3 for further processing, that is, the net interface receiving function 21 of the net interface driver judging whether to continue to send the data to the TPC/IP protocol stack module 3 for process according to the sign of whether being processed or not returned by the Ethernet data package fast receiving process hook function.

From the above, the present invention discloses a method and system for fast transporting real-time media stream data package based on RTP/RTCP (Real-time Transport Protocol/Real-time Transport Control Protocol) of UDP (User Datagram Protocol) for network nodes such as media gateway, IAD (integrated Access Device) and multimedia terminal, the method including: fast receiving the real-time media stream data package transmitted on basis of RTP/RTCP protocol; fast sending the real-time media stream data package transmitted on basis of RTP/RTCP protocol; and the policy ARP table based on the local UDP port and its refurbishing system, in which, the fast receiving process includes: the real-time media stream data package reaching to the net interface driver and receiving function (data link layer), then fast filtering module through newly added IP (Internet Protocol) data package, skipping over the TCP/IP protocol stack module of prior art and sending the real-time media stream data package to buffer of RTP/RTCP application layer directly through the RTP/RTCP fast receiving process function registered on the basis of local UDP port; and the fast sending process includes: the RTP/RTCP application layer calling the newly added UDP data package fast sending process function directly when sending the real-time media stream data package, after the process of UDP fast sending module, calling the net interface sending function of net interface driver to send the data package, by making full use of the characteristics of RTP/RTCP sending real-time media stream, without passing the TCP/IP protocol stack module, the UDP fast sending module maintaining the policy ARP table based on local UDP port and obtaining the next hop MAC address. Therefore, the system and method of the present invention, compared to the receiving and sending of conventional TCP/IP protocol stack and SOCKET programming, can fast process real-time media stream data package, thereby improving the process ability of equipment, reducing the network time delay of the media stream data package, and improving the QoS.

INDUSTRIAL APPLICABILITY

From the comparing test, the method and system of the present invention obviously improves the processing efficiency of the real-time media stream data package, and greatly enhances the processing ability of equipment, therefore reducing the network time delay of the real-time media stream data package and improving the service quality of real-time media stream. The test results show that: by taking general CPU with main frequency of 50M and general 10M/100M adaptive network controller equipment as an example, if using the conventional TCP/IP SOCKET API to process the real-time media stream data package, the voice data stream processing 20 lines G.711 20 ms will occupy about 80% of the CPU processing time, while if using the method and system of the present invention to process the real-time stream data package, the voice data stream processing 20 lines G.711 20 ms, will only occupy about 20% of the CPU processing time, therefore, the processing efficiency of the data package is improved greatly.

It should be understand that, for the person skilled in the art, various changes and modifications can be made according to the technical scheme and spirit of the present invention, and all the changes and modifications shall fall into the protection scope of the appended claims of the present invention.

What we claim is:

1. A system for fast processing real-time media stream data package, comprising: at least one computing device, an IP data package fast filter module, an UDP fast sending module, a policy ARP table process module based on local UDP port and a RTP/RTCP fast receiving process function registered on the basis of UDP port in a RTP/RTCP application layer, each module being executable in the at least one computing device; wherein said policy ARP table process module based on local UDP port is connected and communicated with said IP data package fast filter module and said UDP fast sending module respectively, and is used for constructing an ARP table with a port mapping value being suffix according to distribution of RTP/RTCP protocol port resource and features of the RTP/RTCP protocol port;

said IP data package fast filter module is used for installing a fast receiving hook function in a data link layer receiving function, in which said hook function is used to analyze content of an Ethernet data package; the RTP/RTCP application layer registers the RTP/RTCP fast receiving process function corresponding to the UDP port in the hook function;

said UDP fast sending module is used for directly calling a sending function provided by the UDP fast sending module when the RTP/RTCP application layer sending the real-time media stream data package, and after the process of the UDP fast sending module, calling a corresponding net interface sending function to send out the data; and said IP data package fast filter module is used for receiving the real-time media stream data package from a net interface receiving function, and transporting it to the RTP/RTCP fast receiving process function, thus directly transmitting it to a task buffer of the RTP/RTCP application layer.

2. The system according to claim 1, with characterized in further comprising a TCP/IP protocol stack module, by which SOCKET API sends the data package in the situation that said UDP fast sending module can not accomplish the data package sending.

3. The system according to claim 1, with characterized in the information in the ARP table mainly including: data package destination IP address, next hop MAC address and last refurbishing time of the table.

4. The system according to claim 3, with characterized in the process for said hook function analyzing the content of Ethernet data package including: analyzing whether the data package is an IP data package, if yes, further analyzing whether it is a UDP data package, if yes, further analyzing whether it is a registered data package within the scope of UDP port, if yes, calling the corresponding RTP/RTCP fast receiving process function registered on the basis of UDP port to send the real-time media stream data package to the task buffer of the RTP/RTCP application layer directly.

5. The system according to claim 3, with characterized in the process for said hook function analyzing the content of Ethernet data package including: analyzing whether the data package is an IP data package, if not, the hook function entity further analyzing whether it is a gratuitous ARP package, if yes, initiating an ARP table refurbishing system based on local UDP port policy to invalidate the policy ARP table.

6. A method for fast processing real-time media stream data package, comprising the following steps of:
   a) setting, in at least one computing device, a policy ARP table process module based on local UDP port, and constructing an ARP table with a port mapping value being suffix according to distribution of equipment RTP/RTCP protocol port resource and features of RTP/RTCP protocol port;
   b) calling, in the at least one computing device, a UDP fast sending module to send a RTP/RTCP data package through a RTP/RTCP application layer, and obtaining next hop MAC address by using relevant interface function of TCP/IP protocol stack according to destination IP address of the RTP/RTCP data package;
   c) if obtaining the next hop MAC address successfully, refurbishing, in the at least one computing device, the next hop MAC address in the ARP table and sending the RTP/RTCP data package directly, thereafter, if the destination IP address transmitted on the UDP port does not change and the port ARP table has not reached aging time, then without exception, using the next hop MAC address in the ARP table directly to fill the destination MAC address of Ethernet data package, and fast sending the RTP/RTCP data package; and
   d) if failing in obtaining the next hop MAC address, sending, in the at least one computing device, the RTP/RTCP data package through TCP/IP UDP SOCKET API, so that the TCP/IP protocol stack obtains the next hop MAC address and refurbishes the protocol stack ARP table, when sending the next data package of the port, it is able to obtain the next hop MAC address successfully and refurbish the next hop MAC address in the policy ARP table based on local UDP port.

7. The method according to claim 6, with characterized in further comprising a step of fast sending the RTP/RTCP data package, including the following steps of:
   a1) initializing the whole local Ethernet data frame structure and filling relevant fields according to situation of the RTP/RTCP application layer;
   a2) preparing parameters such as protocol layer data index, data length, original IP address, destination IP address, original UDP port number and destination UDP port number when the RTP/RTCP application layer sending real-time media stream data package, and calling a RTP/RTCP sending function provided by the UDP fast sending module;
   a3) the UDP fast sending module obtaining the next hop MAC address from the ARP table according to the original UDP port number and destination IP address; if failing in obtaining, sending the RTP/RTCP data package through the TCP/IP protocol stack module;
   a4) if obtaining successfully, using the initialized Ethernet data frame structure and filling corresponding fields, and calculating and filling check fields of IP, UDP if necessary;
   a5) calling a net interface sending function to send the data package.

8. The method according to claim 6, with characterized in further including a step of fast receiving the RTP/RTCP data package, includes the following steps of:
   b1) maintaining a protocol layer callback function register according to the distribution of local UDP port resource, and registering a RTP/RTCP fast receiving process function to receive and process the UDP data package corresponding to a destination port number, the RTP/RTCP fast receiving process function writing the RTP/RTCP data package into buffer of the RTP/RTCP application layer;
   b2) registering an Ethernet data package fast receiving process hook function in a net interface receiving function, in which the hook function entity is the IP data package fast filter module, used for analyzing whether the Ethernet data package is the UDP/IP data package of the net interface and performing filter process;
   b3) calling the callback function RTP/RTCP fast receiving process function registered by the RTP/RTCP application layer corresponding to the UDP destination port number according to the destination port number of the UDP data package and RTP/RTCP application layer callback function register, and this callback function accomplishing processing the UDP data package;
   b4) if the IP data package fast filter module has successfully passed the process of callback function RTP/RTCP fast receiving function registered by the RTP/RTCP application layer, then returning a sign of having been processed; and
   b5) the net interface receiving function judging whether to continue sending it to the TCP/IP protocol stack module for process according to the sign of whether having been processed returned by the Ethernet data package fast receiving process hook function.

9. The method according to claim 8, with characterized in analyzing whether it is gratuitous ARP package if having not been processed after step b4; when receiving the gratuitous ARP package on the net interface receiving function, invalidating the MAC address in the ARP table, so as to actively obtain the next hop MAC address from the TCP/IP protocol stack and refurbish the ARP table during the later RTP/RTCP data package sending.

10. The method according to claim 6, with characterized in defining a refurbishing time interval in step d, so as to refurbish the policy ARP table based on local UDP port according to timing.

11. A method for fast processing real-time media stream data package, employed in at least one network device comprising media gateway, IAD and IP multimedia terminal, comprising the following steps of:
- in the direction of receiving, using an IP data package fast filter module in the at least one network device to replace a TCP/IP protocol stack data receiving process function set and SOCKET receiving process; and
- in the direction of sending, using a UDP fast sending module in the at least one network device to replace a TCP/IP protocol stack data sending process function set and SOCKET sending process.

12. The method according to claim 11, with characterized in further including setting a TCP/IP protocol stack module, through which, SOCKET API sending the data package in the situation that said UDP fast sending module can not accomplish sending the data package.

13. The system according to claim 2, with characterized in the information in the ARP table mainly including: data package destination IP address, next hop MAC address and last refurbishing time of the table.

14. The method according to claim 7, with characterized in defining a refurbishing time interval in step d, so as to refurbish the policy ARP table based on local UDP port according to timing.

15. The method according to claim 8, with characterized in defining a refurbishing time interval in step d, so as to refurbish the policy ARP table based on local UDP port according to timing.

16. The method according to claim 9, with characterized in defining a refurbishing time interval in step d, so as to refurbish the policy ARP table based on local UDP port according to timing.

* * * * *